United States Patent [19]

Chang et al.

[11] Patent Number: 5,502,157

[45] Date of Patent: *Mar. 26, 1996

[54] COPOLYIMIDES PREPARED FROM ODPA, BTDA AND 3,4'-ODA

[75] Inventors: Alice C. Chang, Yorktown; Terry L. St. Clair, Poquoson, both of Va.

[73] Assignee: The United States of America as represented by the Administrator of the National Aeronautics and Space Administration, Washington, D.C.

[ * ] Notice: The term of this patent shall not extend beyond the expiration date of Pat. No. 5,464,028.

[21] Appl. No.: 299,172

[22] Filed: Aug. 31, 1994

[51] Int. Cl.$^6$ .......................... C08G 73/10; C08G 69/26
[52] U.S. Cl. .......................... 528/353; 528/125; 528/126; 528/128; 528/171; 528/172; 528/173; 528/179; 528/185; 528/188; 528/220; 528/229; 528/351; 526/935; 428/411.1; 428/473.5
[58] Field of Search .......................... 528/353, 125, 528/126, 128, 171, 172, 173, 179, 185, 188, 220, 229, 351; 526/935; 428/411.1, 473.5

[56] References Cited

U.S. PATENT DOCUMENTS

| 5,061,783 | 10/1991 | St. Clair .................... 528/125 |
| 5,147,966 | 9/1992 | St. Clair et al. .................... 528/188 |

FOREIGN PATENT DOCUMENTS

0459801A2  5/1991  European Pat. Off. .

*Primary Examiner*—P. Hampton-Hightower
*Attorney, Agent, or Firm*—George F. Helfrich

[57] ABSTRACT

A copolyimide was prepared by reacting 3,4'-oxydianiline (3,4'-ODA) with a dianhydride blend comprising, based on the total amount of the dianhydride blend, about 67 to 80 mole percent of 4,4'-oxydiphthalic anhydride (ODPA) and about 20 to 33 mole percent of 3,3',4,4'-benzophenonetetracarboxylic dianhydride (BTDA). The copolyimide may be endcapped with up to about 10 mole percent of a monofunctional aromatic anhydride and has unbalanced stoichiometry such that a molar deficit in the dianhydride blend is compensated with twice the molar amount of the monofunctional aromatic anhydride. The copolyimide was used to prepare composites, films and adhesives. The film and adhesive properties were significantly better than those of LaRC™-IA.

16 Claims, No Drawings

COPOLYIMIDES PREPARED FROM ODPA, BTDA AND 3,4'-ODA

CROSS-REFERENCE TO RELATED APPLICATIONS

This application is related to co-pending patent application Ser. No. 08/299,384, filed Sep. 1, 1994, entitled "A Solvent Resistant Copolyimide", and co-pending patent application Ser. No. 08/299,385, filed Sep. 1, 1994, entitled "A Direct Process for Preparing Semi-Crystalline Polyimides".

ORIGIN OF THE INVENTION

The invention described herein was jointly made by an employee of the United States Government and in the performance of work under a NASA Contract and is subject to the provisions of Section 305 of the National Aeronautics and Space Act of 1958, as amended Public Law 85-568 (72 Stat. 435; 42 U.S.C. 2457).

BACKGROUND OF THE INVENTION

1. Field of the Invention

The present invention relates to copolyimides. In particular, it relates to copolyimides prepared from 4,4'-oxydiphthalic anhydride, 3,3',4,4'-benzophenonetetracarboxylic dianhydride, and 3,4'-oxydianiline.

2. Description of the Related Art

High performance polyimides are rapidly finding new uses as matrix resins for composites, moldings and films in addition to their traditional use as adhesives. Since these materials display a number of performance characteristics such as high temperature and solvent resistance, improved flow for better wetting and bonding, high modulus, and chemical and hot water resistance, they are useful for the manufacture of lighter and stronger aircraft and spacecraft structures.

One example of this type of polyimide is that prepared by St. Clair et al. in "Polyimide Molding Powder, Coating, Adhesive and Matrix Resin", U.S. Pat. No. 5,147,966. This particular polyimide, referred to hereafter as LaRC™-IA, exhibits excellent thermooxidative stability and is melt processable at temperatures ranging from 325°–350° C. LaRC™-IA has a melt temperature (Tm) of 295.2° C., an enthalpy of 33.2 J/g and a glass transition temperature (Tg) of 229.6° C. As a result of these properties, this polymer has shown potential use for molded parts, films, tubing, aircraft wiring insulation and as a matrix resin for a composite. Unfortunately, it is not resistant to solvent when subjected to stress.

Tamai et al. (European Patent Application number 91304893.0) also prepared LaRC™-IA along with several other readily processable polyimides and copolyimides. An example of one such copolyimide is that prepared from 3,4'-diaminodiphenyl ether (3,4'-ODA), 4,4'-oxydiphthalic anhydride (ODPA) and pyromellitic dianhydride (PMDA). Some of the polymers prepared by Tamai et al. exhibited excellent processability, good chemical resistance and outstanding transparency in addition to excellent heat resistance. However, none of the polyimides were subjected to solvent under stress. Rather, they were tested as powders.

An object of the present invention is to prepare a copolyimide from a diamine and a dianhydride blend.

Another object of the present invention is to prepare a copolyimide which is resistant to solvent when subjected to stress.

Another object of the present invention is to prepare a copolyimide which has improved adhesive properties.

Another object of the present invention is to prepare a copolyimide which retains a low melt viscosity at 350° C. while increasing the stiffness of the polymer backbone.

Another object of the invention is to prepare composites, films and adhesives from the copolyimide.

SUMMARY OF THE INVENTION

The foregoing and additional objects of the invention were obtained by preparing a copolyimide by reacting 3,4'-oxydianiline (3,4'-ODA) with a dianhydride blend. The dianhydride blend comprises, based on the total amount of the dianhydride blend, about 67 to 80 mole percent of 4,4'-oxydiphthalic anhydride (ODPA) and about 20 to 33 mole percent of 3,3',4,4'-benzophenonetetracarboxylic dianhydride (BTDA). The resulting copolyimide has the repeat units:

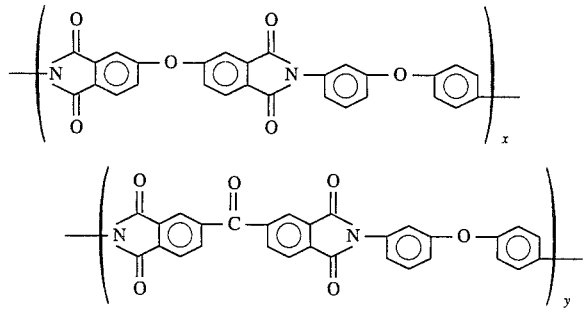

wherein x is 67 to 80 mole percent of the copolyimide and y is 20 to 33 mole percent of the copolyimide.

The copolyimide may be endcapped with up to about 10 mole percent of a monofunctional aromatic anhydride and has unbalanced stoichiometry such that a molar deficit in the dianhydride blend is compensated with twice the molar amount of the monofunctional aromatic anhydride.

The copolyimide was used to prepare composites which had similar properties to LaRC™-IA. Films prepared from the copolyimide were found to be resistant to immediate breakage when exposed to solvents such as dimethylacetamide (DMAc) and chloroform. The adhesive properties were significantly better than those of LaRC™-IA even after testing at 23°, 150°, 177° and 204° C. In addition, the melt viscosity at 350° C. was equal to or lower than that of LaRC™-IA despite stiffening of the polymer backbone.

DESCRIPTION OF THE PREFERRED EMBODIMENTS

By the present invention, a copolyimide having improved adhesive properties and solvent resistance was prepared by reacting 3,4'-oxydianiline (3,4'-ODA) with a dianhydride blend. The dianhydride blend comprises, based on the total amount of the dianhydride blend, about 67 to 80 mole percent of 4,4'-oxydiphthalic anhydride (ODPA) and about 20 to 33 mole percent of 3,3',4,4'-benzophenonetetracarboxylic dianhydride (BTDA). In a preferred embodiment of the invention, the dianhydride blend comprises, based on the total amount of the dianhydride blend, 80 mole percent of ODPA and 20 mole percent of BTDA.

The copolyimide may be endcapped with up to about 10 mole percent of a monofunctional aromatic anhydride and have unbalanced stoichiometry such that a molar deficit in the dianhydride blend is compensated with twice the molar amount of the monofunctional aromatic anhydride. For the present invention, the preferred monofunctional aromatic anhydride is phthalic anhydride. In a preferred embodiment, the unbalanced stoichiometry is such that a 2.5 to 5.0 percent molar deficit exists for the dianhydride blend and 5.0 to 10.0 mole percent of phthalic anhydride is used as an endcapper.

In a most preferred embodiment, the copolyimide is prepared from 3,4'-ODA and a dianhydride blend, comprising 80 mole percent of ODPA and 20 mole percent of BTDA, and the unbalanced stoichiometry is such that a 4.0 percent molar deficit exists for the dianhydride blend and 8.0 mole percent of phthalic anhydride is used as an endcapper.

Composites, films and adhesives were prepared from the copolyimide. Testing indicated that the copolyimide had a Tg which was 10° higher than that of LaRC™-IA. The melt viscosity at 350° C. was unexpectedly 10,000 poise lower for the 80/20 copolyimide as compared to LaRC™-IA. (Table 1)

TABLE 1

| ODPA/ BTDA Mole Ratio | Initial Tg °C. | Tg After Melt °C. | Melt Viscosity (poise) 330° C. | Melt Viscosity (poise) 350° C. |
| --- | --- | --- | --- | --- |
| LaRC™-IA | 229.6 | 229.3 | 78,978 | 64,314 |
| 80/20 | 239.5 | 234.2 | 87,414 | 52,156 |
| 67/33 | 238.0 | 235.4 | 132,000 | 65,518 |
| 50/50 | 238.7 | 238.4 | 178,000 | 122,672 |
| 0/100 | 247.9 | None observed | Could not test | Could not test |

Solvent resistance testing showed that a film of the copolyimide remained creasable in acetone, methylethyl ketone and toluene as did LaRC™-IA but when subjected to DMAc and chloroform, there was improved solvent resistance (Table 2).

TABLE 2

| Cure Temperature | Modified System | DMAc | Chloroform |
| --- | --- | --- | --- |
| 300° C. | LaRC™-IA | ++ | ++ |
|  | 20% BTDA | − | − |
| 350° C. | LaRC™-IA | ++ | ++ |
|  | 20% BTDA | + | − |
| 371° C. | LaRC™-IA | ++ | ++ |
|  | 20% BTDA | + | − |
| 400° C. | LaRC™-IA | + | + |
|  | 20% BTDA | + | + |

(−) Signifies creasable film
(+) Signifies that film breaks after immersion and creasing
(++) Signifies that film breaks into two pieces within one minute of immersion The following are examples which illustrate the preparation and use of the copolyimide for applications such as composites, films and adhesives. These examples are merely illustrative and intended to enable those skilled in the art to practice the invention in all of the embodiments flowing therefrom, and do not in any way limit the scope of the invention as defined by the claims.

EXAMPLES

Example 1

4,4'-oxydiphthalic anhydride (ODPA) (13.5417 g, 0.0436 mole, 3 mole percent stoichiometric offset) was added to a stirred solution of 3,4'-oxydianiline (3,4'-ODA) (18.0218 g, 0.08 mole) in gamma-butyrolactone (GBL) (210 ml), to provide a concentration of 15% solids by weight at ambient temperature. The mixture was stirred for two hours and 3,3',4,4'-benzophenonetetracarboxylic dianhydride (BTDA) (14.0665 g, 0.04365 mole, 3 mole percent stoichiometric offset) was added and stirring was continued for three hours. The endcapper, phthalic anhydride (0.8798 g, 0.00594 mole) was added to control the molecular weight and stirring was continued for two hours. The solution mixture was observed to be viscous. Glacial acetic acid (GAA) (26 ml, 10% of the total solvent weight) was added and the reaction mixture was heated to 120° C. and maintained at that temperature overnight. It was observed that the polyimide powder began to precipitate from the solution after heating for only one hour. The precipitated polyimide powder was collected by filtration, stirred in hot ethanol for 2 hours, filtered and dried under vacuum at 180° C. overnight. Differential scanning calorimetry (DSC) testing showed that the copolyimide exhibited a melt endotherm that had a minimum at 336.1° C. (Tm), with an enthalpy of 29.8 J/g and a Tg of 238.7° C.

Example 2

The copolyimide was prepared following the procedure of Example 1. ODPA (18.0556 g, 0.0582 mole, 3 mole percent stoichiometric offset) was added to a stirred solution of 3,4'-ODA (18.0218 g, 0.09 mole) in GBL (236 ml) to provide a concentration of 15% solids by weight. The mixture was stirred for two hours and BTDA (9.3770 g, 0.0297 mole, 3 mole percent stoichiometric offset) was added. Stirring was continued for 3 hours and phthalic anhydride (0.8798 g, 0.0059 mole) was added. Stirring was continued for 2 hours and GAA (25 ml) was added. The resulting copolyimide had a Tg of 238.0° C., a Tm of 325.6° C. and an enthalpy of 33.8 J/g. The melt viscosity was 65,518 poise at 350° C.

Example 3

The copolyimide was prepared following the procedure of Example 1. ODPA (21.6667 g, 0.0698 mole, 3 mole percent stoichiometric offset) was added to a stirred solution of 3,4'-ODA (18.0218 g, 0.09 mole) in GBL (208 ml). The mixture was stirred for two hours and BTDA (5.6262 g, 0.0175 mole, 3 mole percent stoichiometric offset) was added. Phthalic anhydride (0.8798 g, 0.00594 mole) and GAA (25 ml) were added. The resulting copolyimide had a Tg of 239.5° C., a Tm of 31 8.6° C. and an enthalpy of 39.5 J/g. The melt viscosity at 350° C. was 52,156 poise.

Example 4

The procedure of Example 1 was followed to prepare the following polyimide homopolymer. BTDA (25.0054 g, 0.0776 mole, 3% stoichiometric offset) was added to a stirred solution of 3,4'-ODA (16.0194 g, 0.08 mole) in GBL (214 ml) to provide a concentration of 15% solids by weight. The reaction mixture was stirred at ambient temperature for 3 hours and the phthalic anhydride endcapper (0.7821 g, 0.0053 mole) was added. Stirring was continued for 2 hours and GAA (26 ml) was added. The resulting polyimide powder had a Tg of 247.9° C.

Example 5

The procedure of example 1 was followed to prepare the following copolyimide. ODPA (21 4.4330 g, 0.6912 mole, 4% stoichiometric offset) was added to a stirred solution of 3,4'-ODA (180.2178 g, 0.9 mole) in NMP (1042.3 ml) to provide a concentration of 30% solids by weight. The mixture was stirred for two hours and BTDA (55.6822 g, 0.1728 mole) was added. Stirring was continued for 3 hours and phthalic anhydride (10.6646 g, 0.072 mole) was added. Stirring was continued overnight. The resulting copolyamic acid had an inherent viscosity of 0.36 dL/g.

Example 6

The copolyamic acid from example 5 was used to prepare a film. The copolyamic acid solution was diluted to 20% solids by weight and cast on a glass plate using a doctor blade which was set at 22 mil. The film was dried in a dry box until it was tack-free. The films were cured for one hour each at 100° and 200° C. and the final cure temperature as shown in Table 2. The film was cut to a width of 0.5 inches and a thickness of 0.003–0.005 inches. Solvent resistance testing was conducted for each film by immersing the imidized film in solvent for one minute, bending the film lengthwise and checking the film for breakage. Results from this testing are found in Table 2.

Example 7

The copolyamic acid resin of example 5 was used to prepare composite laminates. The unidirectional prepreg was fabricated by both standard drum winding procedures and a multi-purpose tape machine. The prepregs were B-staged in a press set at 450° F. for 1 hour. A pressure of 250 psi was applied at the subsequent temperature ramp. When the temperature reached 500° F., vacuum was applied. The composites were tested to determine their physical properties using test methods which are known to those skilled in the art. Results from this testing are given in Table 3.

TABLE 3

| Mechanical Property | Test Condition °C. | LaRC™-IA (4% offset) | Example 7 |
| --- | --- | --- | --- |
| SBS Strength, Ksi | 23 | 16.70 | 12.11 |
|  | 93 | 14.99 | 10.63 |
|  | 150 | 13.86 | 7.92 |
|  | 177 | 8.32 | 6.46 |
| 0° Flexural Strength, Ksi | 23 | 195.6 | 212.9 |
|  | 93 | 165.0 | 180.6 |
|  | 150 | 139.8 | 167.0 |
|  | 177 | 131.8 | 134.7 |
| 0° Flexural Modulus, Msi | 23 | 12.3 | 18.9 |
|  | 93 | 12.0 | 18.5 |
|  | 150 | 12.9 | 19.0 |
|  | 177 | 13.2 | 17.9 |
| $G_{IC}$, in-lb/in$^2$ | 23 | 10.4 | 10.7 |
| 0° Tensile Strength, Ksi | 23 | 338.9 | 340.0 |
|  | 177 | 329.1 | 286.0 |
| Modulus, Msi | 23 | 22.7 | 23.1 |
|  | 177 | 23.4 | 21.8 |
| 0° IITRI Compression Strength, Ksi | 23 | 179.9 | 131.8 |
| Modulus, Msi | 23 | 20.0 | 22.1 |
| CAI Strength, Ksi | 23 | 44.3 | 39.2 |
| Modulus, Msi | 23 | 7.9 | 8.5 |
| OHC Strength, Ksi | 23 | 45.8 | 43.9 |
|  | 177 | 33.0 | 32.5 |

Example 8

An adhesive was prepared from the copolyamic acid of example 5. The copolyamic acid was diluted to 25% solids by weight and was brush coated on to a 112 E-glass cloth having an A-1100 finish to form an adhesive tape. After each coat was applied, the tape was placed into a forced-air oven and heated for one hour each at 100°, 175° and 225° C. The copolyamic acid was reapplied to the cloth until the thickness was approximately 13 mil. The tape was heated to obtain less than 2% volatiles. The prepared adhesive tape was used to bond lap shear specimens with titanium adherends. The specimens were heated at 325° C. and 25 psi for one hour in order for bonding to take place. The specimens were tested at various temperatures using conventional test methods known to those skilled in the art. The results from this testing are given in Table 4.

TABLE 4

| Test Condition | LaRC™-IA Strength, psi | Example 8 Strength, psi |
| --- | --- | --- |
| 23° C. | 4437 | 5560 |
| 150° C. | 4554 | 5135 |
| 177° C. | 3833 | 4523 |
| 204° C. | 2104 | 3097 |

What is claimed is:

1. A copolyimide comprising the repeat units:

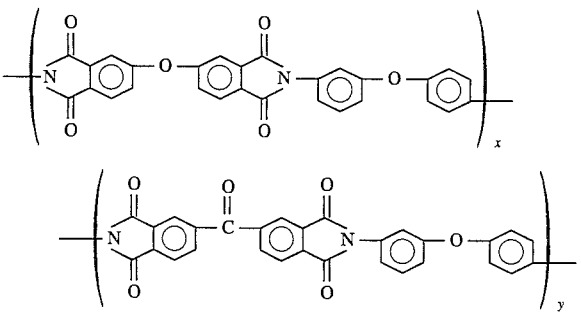

wherein x is 67 to 80 mole percent of the copolyimide and y is 20 to 33 mole percent of the copolyimide.

2. A copolyimide prepared by reacting 3,4'-oxydianiline with a dianhydride blend comprising, based on the total amount of the dianhydride blend, about 67 to 80 mole percent of 4,4'-oxydiphthalic anhydride and about 20 to 33 mole percent of 3,3',4,4'-benzophenonetetracarboxylic dianhyride and wherein the copolyimide has been endcapped with up to about 10 mole percent of a monofunctional aromatic anhydride and having unbalanced stoichiometry such that a molar deficit in the dianhydride blend is compensated with twice the molar amount of the monofunctional aromatic anhydride.

3. A copolyimide of claim 2, wherein the dianhydride blend comprises, based on the total amount of the dianhydride blend, 80 mole percent of 4,4'-oxydiphthalic anhydride and 20 mole percent 3,3',4,4'-benzophenonetetracarboxylic dianhydride.

4. A copolyimide of claim 2, wherein the monofunctional aromatic anhydride is phthalic anhydride.

5. A copolyimide of claim 2, wherein the unbalanced stoichiometry is such that a 2.5 to 5.0 percent molar deficit exists for the dianhydride blend and 5.0 to 10.0 mole percent of phthalic anhydride is used as an endcapper.

6. A copolyimide of claim 3, wherein the unbalanced stoichiometry is such that a 2.5 to 5.0 percent molar deficit exists for the dianhydride blend and 5.0 to 10.0 mole percent of phthalic anhydride is used as an endcapper.

7. A copolyimide of claim 6, wherein the unbalanced stoichiometry is such that a 4.0 percent molar deficit exists for the dianhydride blend and 8.0 mole percent of phthalic anhydride is used as an endcapper.

8. A composite prepared from the copolyimide of claim 1.

9. A film prepared from the copolyimide of claim 1.

10. An adhesive prepared from the copolyimide of claim 1.

11. A composite prepared from the copolyimide of claim 2.

12. A film prepared from the copolyimide of claim 2.

13. An adhesive prepared from the copolyimide of claim 2.

14. A composite prepared from the copolyimide of claim 7.

15. A film prepared from the copolyimide of claim 7.

16. An adhesive prepared from the copolyimide of claim 7.

* * * * *

UNITED STATES PATENT AND TRADEMARK OFFICE
CERTIFICATE OF CORRECTION

PATENT NO. : 5,502,157
DATED : March 26, 1996
INVENTOR(S) : Alice C. Chang, et al It is certified that error appears in the above-indentified patent and that said Letters Patent is hereby corrected as shown below:

On title page, insert the following:

[*] Notice:

Third line, please correct the U.S. Patent No. to read ---5,464,928---.

Signed and Sealed this

Eighteenth Day of June, 1996

*Attest:*

BRUCE LEHMAN

*Attesting Officer*  *Commissioner of Patents and Trademarks*